Sept. 9, 1969 W. M. FLOOK, JR 3,466,097
SKID DETECTING DEVICE
Filed Sept. 27, 1967 2 Sheets-Sheet 1
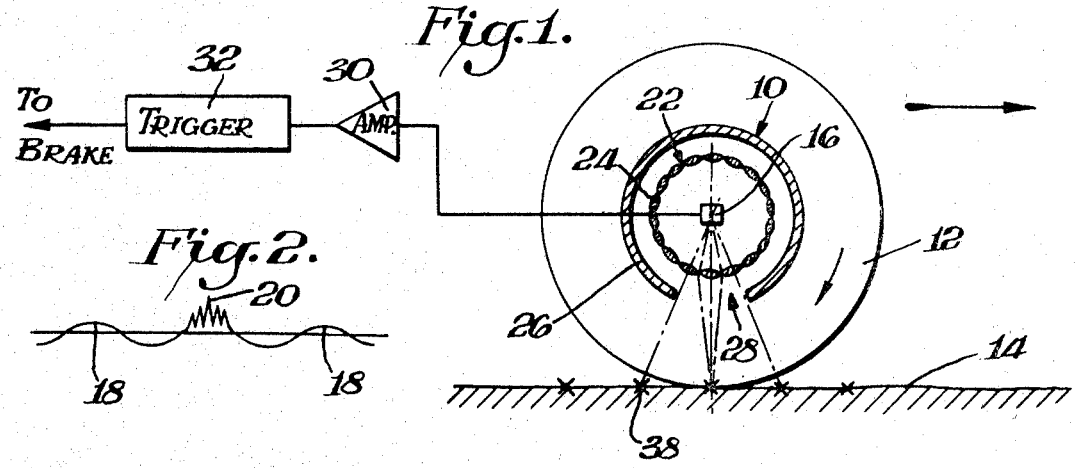
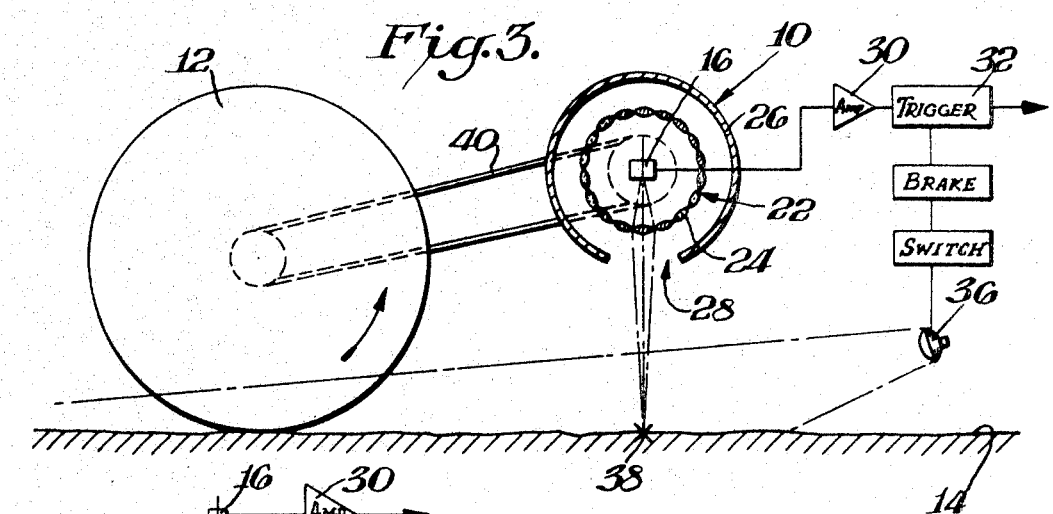
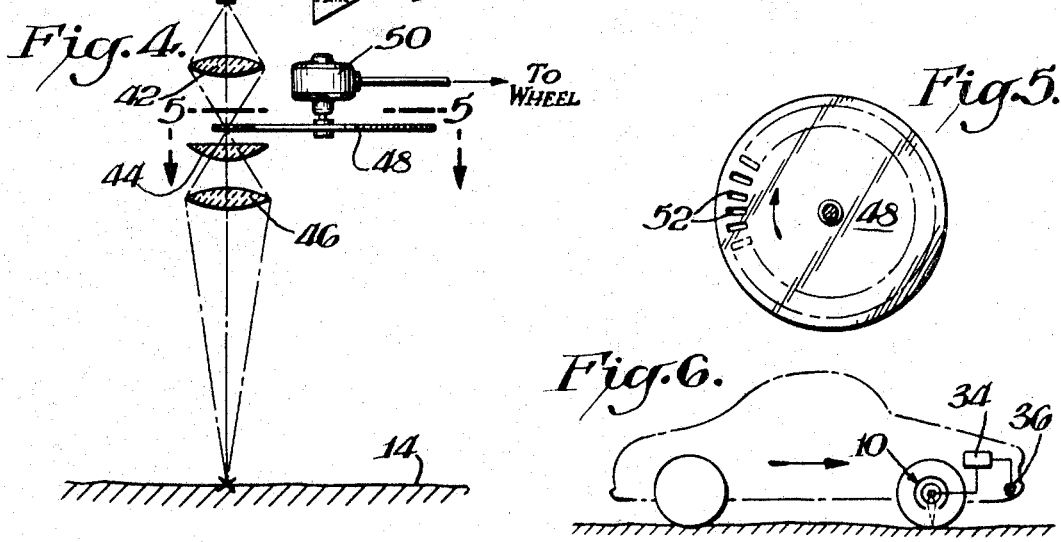

United States Patent Office 3,466,097
Patented Sept. 9, 1969

3,466,097
SKID DETECTING DEVICE
William M. Flook, Jr., Greenspring Road,
Greenville, Del. 19807
Filed Sept. 27, 1967, Ser. No. 670,848
Int. Cl. B60t 8/10
U.S. Cl. 303—21                                   5 Claims

ABSTRACT OF THE DISCLOSURE

A device for detecting slippage or skidding between a rolling wheel such as a vehicle wheel and a fixed surface such as a road over which the wheel rolls includes an optical element which is rotated in synchronization with the wheel, an image dwells on a point on the surface when there is rolling motion, and moves relative to the point on the surface when slippage occurs.

Background of invention

The growing trend for automobile safety devices has resulted in the development of automatic brake control arrangements which are designed to augment the judgment of the driver by allowing a computer to take at least partial control of the vehicle braking system in the event of an out-of-control skid. A system of this kind requires some form of sensor to provide input information signaling the onset and magnitude of conditions which lead to loss of control, such as wheel skidding.

Brief summary of invention

An object of this invention is to provide a skid detecting sensor which is adapted to be utilized as an input for computer-controlled automatic braking means.

A further object is to provide such a device which detects a skid by use of optical elements.

A still further object of this invention is to provide an arrangement which utilizes the principles of the skid detecting device in a non-contacting optical speedometer.

In accordance with one aspect of this invention, the device for detecting a slippage or skid includes means for rotating an optical element in synchronism with a vehicle wheel, so as to cause one or more images of a photodetector to scan the surface of the roadway in a plane parallel to the axis of the vehicle. In normal rolling motion these images dwell momentarily on points on the road surface. When slippage or skidding is present between the wheel and the road, these images move relative to the road surface, generating high frequency signal components not present in normal rolling motion.

In accordance with another aspect of this invention, one or more such optical systems may be mounted so as to scan the roadway surface in planes disposed at an angle to the direction of the vehicle axis and to each other. If the direction of the vehicle velocity vector deviates from that of the vehicle axis, as in a skid, the frequency components from one detector will rise while the frequency components of the signal from the other detectors will fall, thus indicating the magnitude and the direction of the skid.

In an advantageous form of this invention, the optical element is a lens and the image is that of a photodetector. The lens may be part of a rotating linticular drum having a plurality of lenses around its periphery, with a fixed shield being mounted around the drum and having a circumferential opening therein to permit each lens to be slectively disposed optically toward the road surface. The lenses may be so dimensioned with respect to the opening that a plurality of lenses are disposed at the opening at all times. The device may include means for selectively amplifying high frequency components of the photodetector output to yield a signal which is characteristic of slippage. Additionally, the vehicle brake may be utilized to actuate an illuminating device which illuminates the road surface point at grazing incidence thereto. The lenticular drum may be mounted directly on the wheel or remote therefrom.

In a further form of this invention the optical element may be a spatial filter in an optical system, such as a rotating chopper disc or drum having a plurality of slits or other inhomogeneities uniformly distributed about its periphery. The optical system may include a collector lens between the photoconductor and the chopper disc, and may also include an objective lens between the chopper disc and the surface, with a field lens between the objective lens and the chopper disc.

The principles of this invention may also be utilized in a speedometer to measure the rate of travel over the reference surface by suspending he rotatable lenticular drum or spatial filter a fixed distance from the reference surface, and altering its rotational speed until a minimum occurs in the frequency components of the output signal from the photodetector.

The drawings

FIG. 1 is a schematic view of a skid detecting device in accordance with this invention;

FIG. 2 illustrates the frequency characteristics of the skid device of FIG. 1;

FIGS. 3 and 4 are modified forms of the skid device of FIGS. 1–2;

FIG. 5 is a cross-sectional view taken through FIG. 4 along the line 5–5;

FIG. 6 is a schematic view showing the skid detector device of this invention in an automobile;

Figure 10:
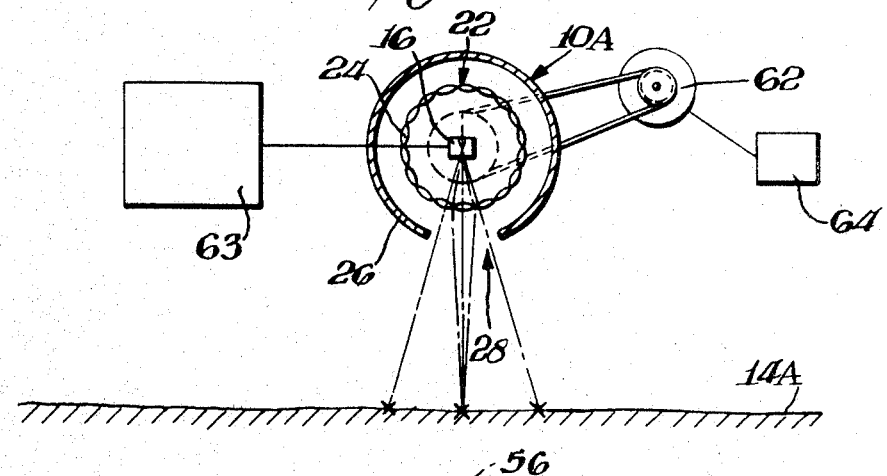
Figure 7:
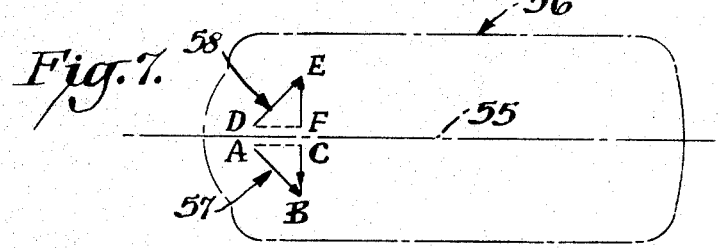
FIG. 7 is a schematic view of two skid detector devices in accordance with another aspect of this invention.
Figure 8:
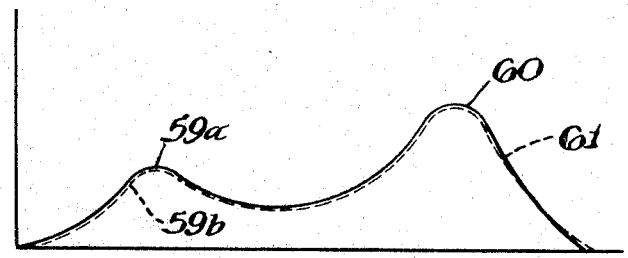
Figure 9:
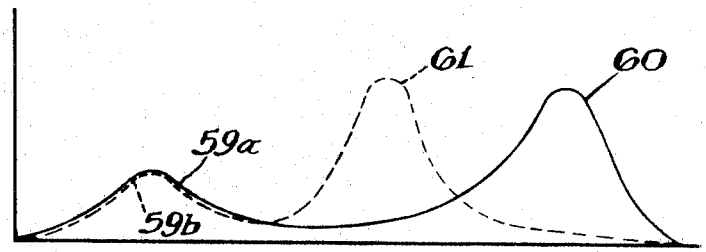

FIGS. 8 and 9 graphically show the output signals from the arrangement of FIG. 7 under normal and skidding conditions, respectively; and FIG. 10 is a schematic view of a speedometer in accordance with another aspect of this invention.

Detailed description

The skid detecting device 10 of this invention, as illustrated in FIG. 1, may be mounted coaxially upon a vehicle wheel 12 and may rotate with the wheel. The device as later described looks radially down at the road surface 14. In normal rolling operation there is only slight relative motion between the field of view of device 10 and the surface 14 of the road. In a skid, however, the road surface moves relative to the lowest point of the wheel and also relative to the field of view of device 10.

FIG. 2 illustrates the high frequency characteristics of the light received in photodetector 16 of device 10. The sinusoidal waves 18 shown in the extreme right and lefthand portions of FIG. 2 relate to the normal low frequency modulation pattern when there is only slight relative movement between the field of view and the road surface, such as in rolling motion. The perturbations 20 in the center of FIG. 2 are generated in the light received at the photodetector 16 imaged on the road surface when there is relative motion between the device 10 and surface 14 with these perturbations being caused by the motion of optical inhomogeneities through the field of view.

With reference again to FIG. 1, device 10 includes a transparent lenticular drum 22 having a plurality of individual lenses 24 which are mounted for rotation in synchronization with wheel 12. A non-rotating fixed mask 26 is arranged around the drum and is provided with an opening 28 so that at least two individual lenses 24 are exposed to the road surface 14. Photodetector 16 at the center of drum 22 is connected to high frequency amplifier 30 which in turn may be connected to a triggering mechanism 32 to provide an output only upon detection of high frequency signal 20.

As later described, the road surface 14 may be illuminated preferably at grazing incidence by a light source 36 (FIGS. 3, 6) which is actuated when the brake 34 is applied.

With reference again to FIG. 1, as each lens 24 on the lenticular drum 22 rotates to a position opposite the hole 28 in mask 26, the lens focuses an image of the photodetector 16 at a spot such as 38 on the road surface. As the wheel rotates that lens moves behind the mask so as to keep the image of the photodetector fixed approximately at the same spot 38 on the road surface. As the lens 24 moves across opening 28, the light from the spot 38 on the road 14 builds from zero to a maximum and then gradually fades away to zero again, as the lens moves away from the opening, to create a portion of the low frequency modulation wave 18 shown in FIG. 2. The shape of the opening 28 may be dimensioned to minimize the variation and to make a smooth modulation in light intensity having only low frequency components related to the rotational speed of the wheel. As noted above, a plurality of lenses are disposed at the opening 28 at any given time so that the amplitude of this low frequency modulation is small in that one lens takes over as another moves away.

As also indicated above, each lens 24 picks a separate spot 38 on the road surface 14; while the wheel rotates, the lens looks at this spot for a fixed portion of wheel rotation and then moves behind the mask 26. Because the road surface is never absolutely uniform (as better shown in FIG. 3) the light reaching the photodetector 16 from each lens will be slightly different in intensity to create a low frequency modulation due to the road surface in addition to the low frequency modulation due to the mask. The period of this low frequency modulation varies with the rotational speed of the wheel and is thus, a measure of the speed, while its amplitude is a measure of the road surface uniformity.

During a skid the images of the photodetector 16 do not remain fixed on a single spot on the road as each lens moves away from the opening 28, rather the road surface moves under the image generating the high frequency changes 20 in the light reaching the photocell 16. These high frequency transient signals are amplified by amplifier 30 to yield an electrical output only when a skid is present, and this electrical output may be used, for example, to actuate the trigger 32, or it may be used as an input to an automatic skid control computer.

With respect to various expressions used above, when applied to such vehicles as automobiles, the term "high frequency" is used to mean signals having frequency components between 200 c.p.s. (Hz.) and 10,000 c.p.s., and by "low frequency" is meant signals having frequency components no higher than about 80–90 c.p.s. When applied, however, to aircraft landing systems, these frequency ranges may both have higher values.

FIG. 1 shows the skid detecting device 10 mounted coaxially with wheel 12. A variation of this arrangement, however, is shown in FIG. 3. As indicated therein device 10 is mounted remote from wheel 12 but is driven in synchronization therewith by any conventional means such as an interconnecting belt drive 40 or any other suitable drive link which might be geared to the wheel shaft, or by an electrical synchro system. In the arrangement shown in FIG. 3 the lenticular drum 22 is again driven at such a speed that the images dwell on a point on the road surface during rolling motion. The actual angular speed at which the drum is driven depends upon the distance between the photodetector 16 and the road 14 which may or may not be the same as the radius of wheel 12. Where the distance between detector 16 and the road surface 14 is greater than the radius 12, the angular speed of the drum 22 is less than that of the wheel to keep the linear speed of the image of the detector in pace with the speed of the road.

As indicated above in an advantageous form of this invention, the road surface 14 is illuminated by a light source 36 which is actuated when the brake 34 is depressed. The light source 36 (FIG. 3) is preferably fixed at grazing incidence to the road to cast shadows on any small bumps, pits, or any other irregularities in the road thereby enhancing the optical irregularity of the road surface which maximizes the effectiveness of device 10. Any sharp edged discontinuities in optical reflectance such as a stone or a hole or even normal irregularities in a road would generate the high frequency signals 20 during a skid.

The effectiveness of this device depends on the ability to distinguish between low frequency signal components due to road surface irregularities and high frequency components due to a skid. As an example showing the frequency ranges to be expected at automobile highway speeds, assume that a skid detector of the type shown in FIG. 3 is so arranged that the detector 16 is located twenty-four inches from the road surface, and that the size of its image on the roadway is one tenth of an inch. It the opening in the fixed mask is thirty-six degrees wide, each image of the photodetector will dwell on the road surface while the vehicle travels 1.25 feet. The ratio between the high frequency components generated when the detector image moves over a sharp edged discontinuity in road surface reflectivity, as in a skid, and the normal low frequency components, will then be 150 to one. This is the ratio between 1.25 feet and one tenth of an inch. Such a frequency ratio is very easily distinguished by conventional electronic techniques.

With the vehicle moving at 60 miles per hour, the low frequency signals in the above example will be centered around 70 cycles per second. High frequency components up to 10,000 cycles per second will be generated in a wheel-locked skid.

An advantageous detector 16 may be a lead sulfide cell. The light source could then be in the near infrared region of the spectrum and invisible to the human eye. A region of the spectrum should be chosen, however, where maximum contrast is obtained for normal inhomogeneities in road surfaces.

The arrangements illustrated in FIGS. 1 and 3 match some part of an optical system with the expected velocity of the road. When the expected velocity differs from the true velocity, the image of the road moves relative to the optical system and generates high frequency noise which characterizes a skid. Specifically, in the arrangements shown in FIGS. 1 and 3, the part of the optical system which moved was the lens. FIGS. 4–5, however, show an alternative arrangement which includes a spatial filter in the optical system. Specifically, as illustrated in FIGS. 4–5, the system again includes a photo-detector 16 which is connected to amplifier 30 and which has a field of vision upon road surface 14. The system, however, also includes a collector lens 42 mounted above field lens 44 and objective lens 46. The spatial filter which may be in the form of a chopper disc 48 is disposed in the image plane and is connected to rotate in synchronization with the wheel by gear box 50. As better shown in FIG. 5, the chopper disc 48 includes a plurality of slits or other optical inhomogeneities 52 uniformly distributed about its periphery so that individual slits are passed through the optical axis of the optical system which includes detector 16 and lenses 42, 44, and 46.

In operation, all of the components of the optical systems except chopper disc 48 are fixed. The disc 48, however, rotates in the image plane of the objective lens with the gear ratio of gear box 50 being adjusted so that the linear speed of the slits on the chopper disc 48 matches the linear speed of the image of the road surface on the disc. The slits in the chopper disc match portions of the image and follow these portions as they move across the field of view. Field lens 44 acts to widen the field of view and to permit a considerable motion of a point on the road surface before its image leaves the detector 16, which may be of extended area. Lens 44 is disposed as close as possible to the image plane of the objective lens 46. The collector lens 42 relays the road image and the slits to the detector 16.

As long as the wheel which drives the chopper disc 48 rolls on the road, the chopper slits 52 keeps pace with the image and do not alter it. If there is skidding, however, the image of the road no longer keeps pace with the chopper disc. The slits 52 sweep across the image and yield a high frequency modulation of light intensity which is characteristic of a skid.

Thus far two arrangements have been described whereby an optical element, such as in image or a mask, is moved in a direction approximately parallel to the vehicle axis, which in normal operation is also the direction of the vehicle velocity vector, in such a way that the speed of the optical element matches the relative speed of the roadway. Such an arrangement gives information only as to whether a single wheel is rolling or sliding.

The same principles can also be used to give information as to whether the vehicle axis coincides with the direction of its velocity vector, and as to the magnitude and direction of any deviation from this condition. In a skid, the vehicle axis can easily deviate from the direction of motion, until in an extreme case the vehicle is pointing at right angles to its motion and may roll over.

In the embodiment of the invention shown in FIG. 7, two optical systems 57, 58 may be oriented, as in FIGURE 6, so as to scan the roadway at an angle to the axis 55 of vehicle 56. If driven in synchronism with a wheel, optical system 57 scans from point A on the roadway to point B on the roadway while the vehicle moves from point A to point C. Thus the image of the photodetector of optical system 57 moves laterally a distance CB on the roadway each time a scan is made. Similarly, the image of the photodetector of optical system 58 moves a distance FE each time a scan is made.

The motion of the images from C to B and from E to F during each scan gives rise to high frequency components 60, 61 in FIGURE 8 in the output of each photodetector in normal operation, in addition to the low frequency peak 59a and 59b due to the scanning process. In non-skidding operation, the average noise power as a function of frequency will be equal for each detector, as shown in FIGURE 8. If, however, the vehicle axis deviates from the direction of its velocity vector, one of the two optical systems will come more into line with the relative motion of the roadway while the other will go further out of line. Thus, in a skid, distance CB may decrease while distance FE increases. The average high frequency noise power output of the two detectors will then no longer be equal. As shown in FIG. 9, the high frequency peak 61 from detector 57 will move toward lower frequencies, and the high frequency peak from detector 58 will move toward higher frequencies. Conventional electronic discriminator means can be used to measure the sense and magnitude of these frequency shifts, and so to indicate the sense and magnitude of the skid.

Although this invention has been described as a means of detecting a skid, the same principles may also be applied to a non-contacting optical speedometer. As illustrated in FIG. 10, the device again includes a lenticular drum 22 having individual lenses 24 disposed in fixed mask 26 having an opening 28. This device 10A differs from device 10, however, in that 10A is suspended a fixed distance above the reference surface 14A which may be a road, water or any other surface which moves with respect to the center of rotation of the lenticular drum 22. The drum 22 is driven by a variable speed motor 62, which may be connected to any suitable indicator 64, such as a tachometer. When the angular speed of drum 22 is such that the image of the detector 16 on the moving surface matches the linear speed of the surface, each image is stationary on the surface. Thus, the high frequency component of the variation in light intensity at the photodetector 16 is minimized. The speed of rotation of drum 22 is varied until such minimum is sensed by any suitable electronic means, such as frequency meter 63, at that point the drum speed is a measure of the linear velocity.

Similarly, the arrangement shown in FIG. 4 may also be adapted to and incorporated in a non-contacting speedometer in accordance with this invention.

What is claimed is:

1. A device for detecting slippage between a rolling wheel and a fixed surface over which the wheel rolls comprising an optical element, means for moving said element in synchronization with the wheel, image means dwelling on a point on the surface when there rolling motion between the wheel and surface and moving relative to the point when there is slippage between the wheel and surface, said optical element being a lens, said image means being a photodetector, said lens being part of a lenticular drum having a plurality of such lenses at its periphery, a fixed shield being mounted around said drum with a circumferential opening therein to permit each lens to be selectively disposed optically toward the surface, means for amplifying high frequency components of the photodetector output to yield a signal characteristic of slippage; in combination thereof, vehicle means capable of having braking action, trigger means for controlling the braking action of said vehicle means, and the high frequency output being the actuating means for said trigger means.

2. A device as set forth in claim 1 including illuminating means for illuminating at grazing incidence the point on the surface, switch means for activating said illuminating means, and said switch means being actuated by the brake of said vehicle means.

3. A vehicle, a device for detecting slippage between a rolling wheel on said vehicle and a fixed surface over which the wheel rolls in combination therewith, braking means in said vehicle, said device comprising image forming and receiving means, means for moving a portion of said image forming and receiving means in synchronization with the vehicle wheel, said image forming and receiving means further including photodetector means which produce a low frequency output during normal rolling motion between the vehicle and the fixed surface and a characteristic higher frequency output when slippage therebetween occurs; trigger means for controlling said braking means in said vehicle, and said higher frequency output being the actuating means for said trigger means.

4. A device as set forth in claim 3 wherein said portion of said image forming and receiving means moving in synchronization with the wheel is a lenticular drum.

5. A device as set forth in claim 3 wherein said portion of said image forming and receiving means moving in synchronization with the wheel is a spatial filter.

References Cited

UNITED STATES PATENTS

| | | |
|---|---|---|
| 3,006,235 | 10/1961 | Brandon. |
| 3,059,521 | 10/1962 | Clemens et al. |
| 3,308,710 | 3/1967 | Stavis. |

FOREIGN PATENTS 474,554   11/1937   Great Britain.

MILTON BUCHLER, Primary Examiner

JOHN J. McLAUGHLIN, Jr., Assistant Examiner

U.S. Cl. X.R.

73—129; 105—73; 291—2; 356—27